Oct. 30, 1923.　　　　　　　　　　　　　　　　　1,472,768
H. S. DICKINSON
WHEELED PLOW
Original Filed July 25, 1918　　4 Sheets-Sheet 1
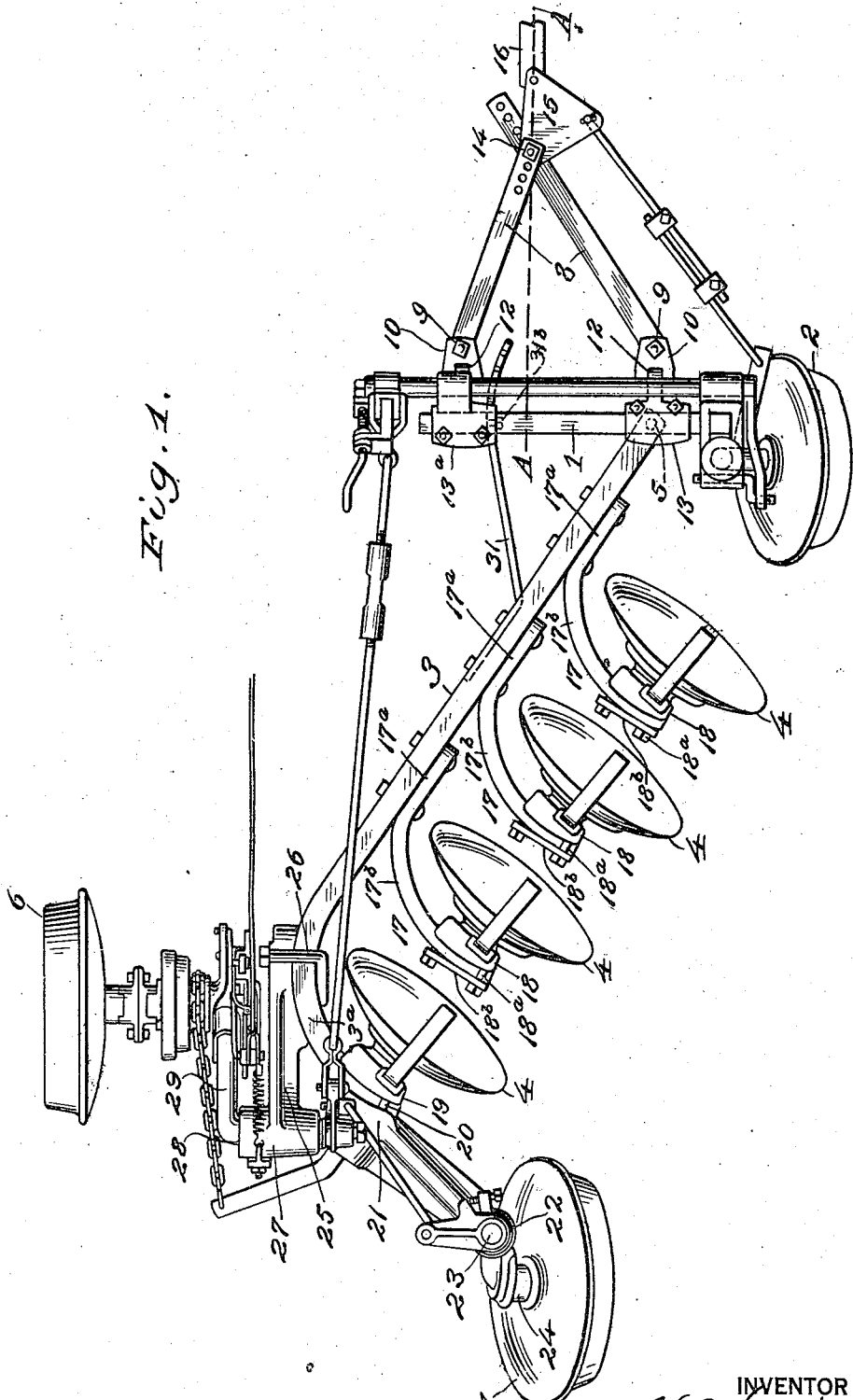
INVENTOR
N. S. Dickinson
BY
Rogers, Kennedy Campbell
ATTORNEYS

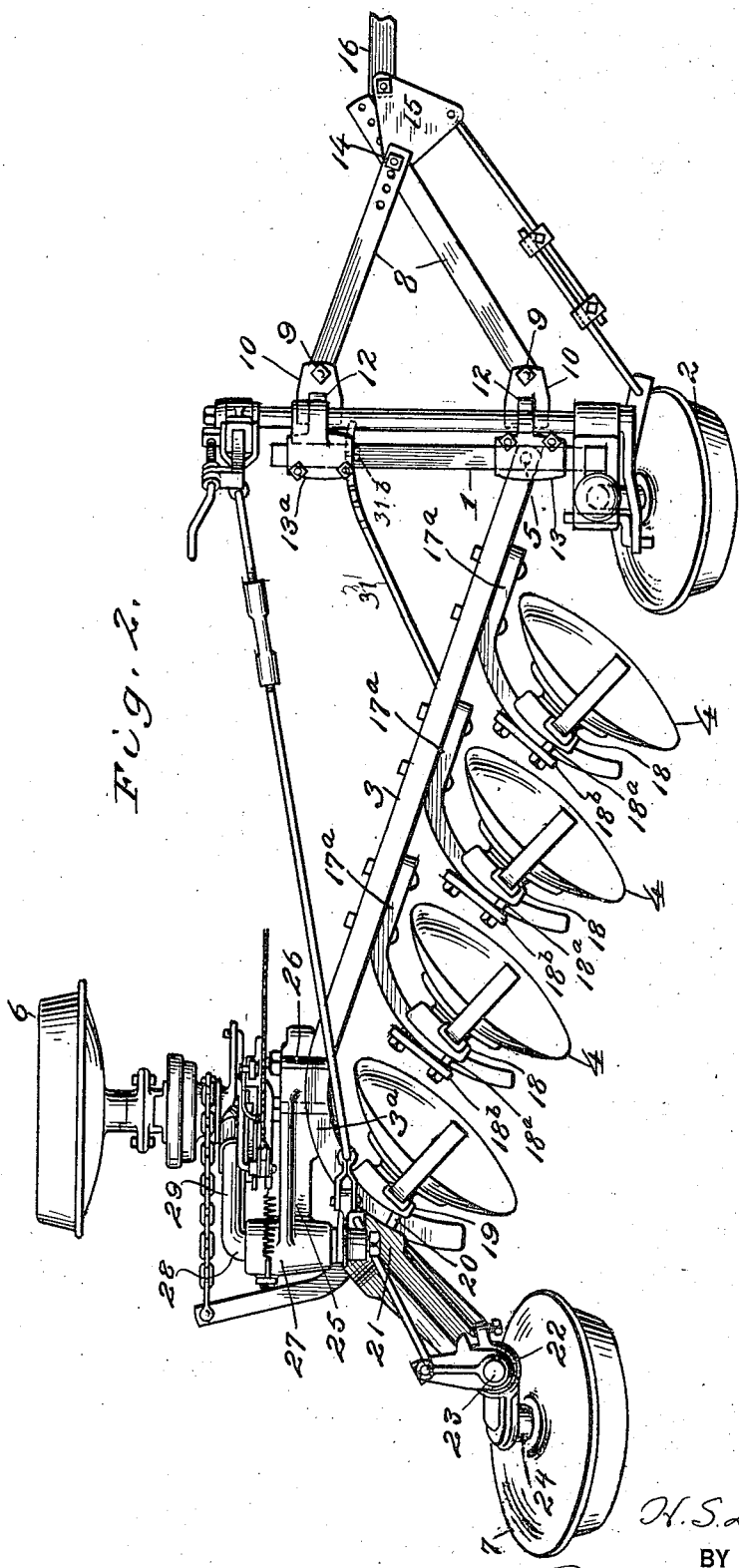

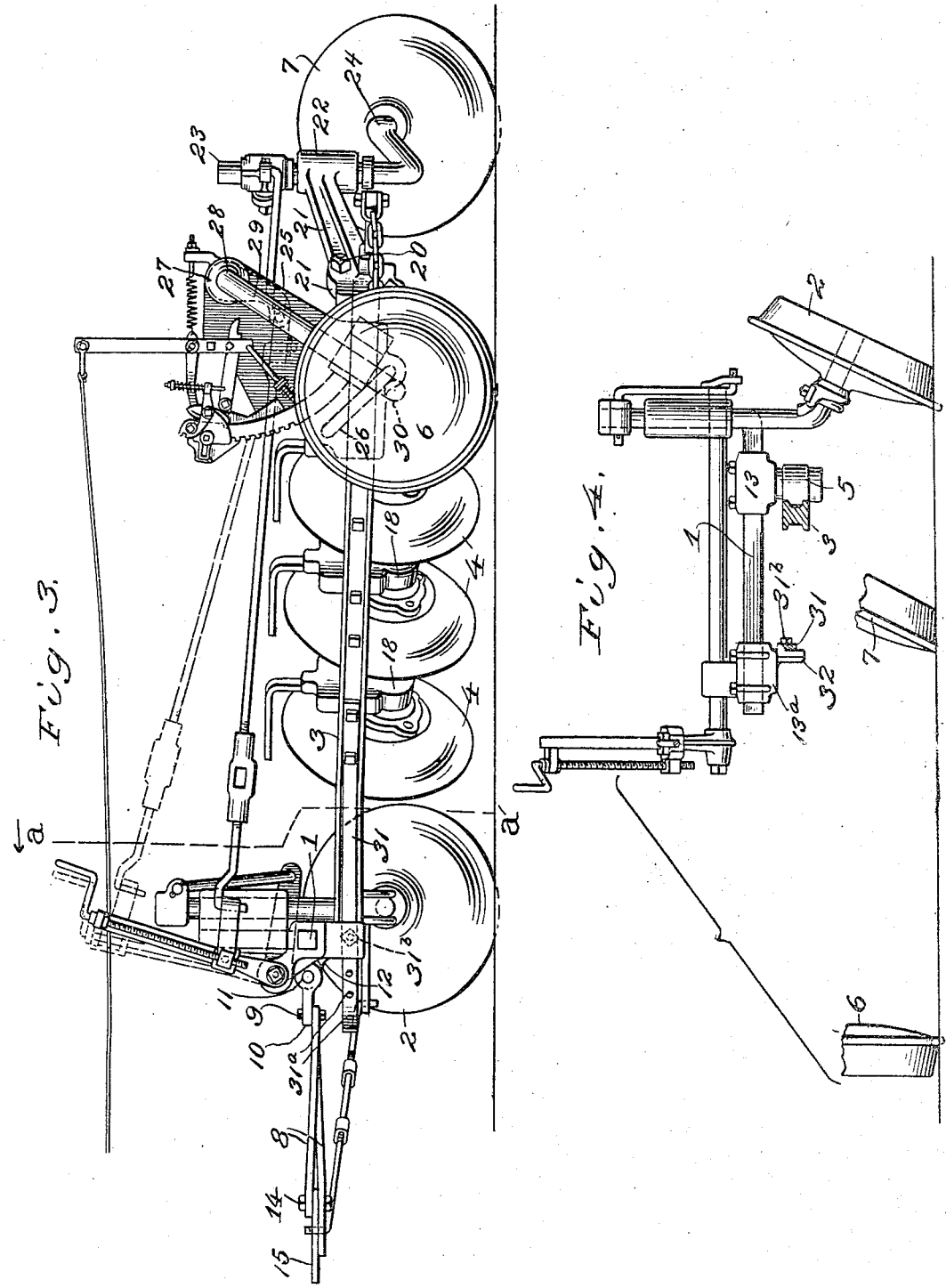

Oct. 30, 1923.
H. S. DICKINSON
WHEELED PLOW
Original Filed July 25, 1918     4 Sheets-Sheet 4
1,472,768
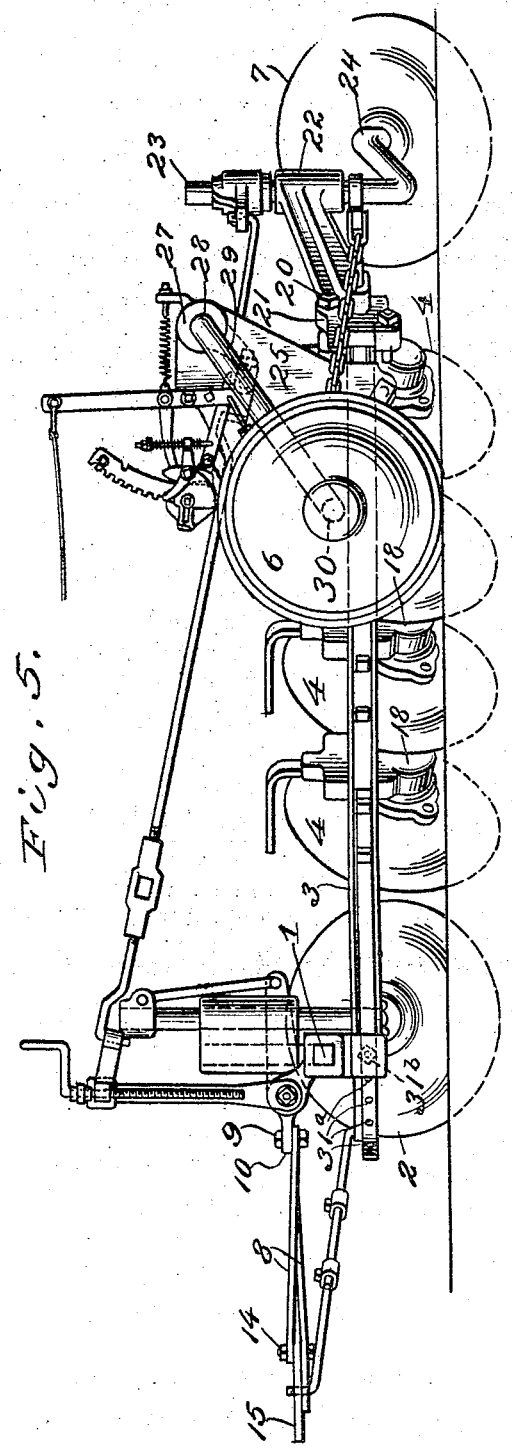
INVENTOR
H. S. Dickinson
BY
Rogers, Kennedy & Campbell
ATTORNEYS Patented Oct. 30, 1923.

1,472,768

UNITED STATES PATENT OFFICE.

HARRY S. DICKINSON, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

WHEELED PLOW.

Original application filed July 25, 1918, Serial No. 246,640. Divided and this application filed February 14, 1919. Serial No. 276,890.

*To all whom it may concern:*

Be it known that I, HARRY S. DICKINSON, a citizen of the United States, residing at Moline, in the county of Rock Island and State of Illinois, have invented certain new and useful Improvements in Wheeled Plows, of which the following is a specification, reference being had therein to the accompanying drawing, being a division of original application filed July 25, 1918, Serial No. 246,640.

The invention relates to wheeled plows.

It relates more particularly to the type of plows known as disk plows and it is especially concerned with a construction for varying the width of cut of plows of this type.

Disk plows usually include a frame supporting a plurality of disks arranged in eschelon. When the plow is used in hard or difficult land, it is necessary to cut only a narrow furrow slice but when the plow is used in soft land, a wider furrow slice is desirable. Plows have been constructed in which the width of the furrow is varied by changing the position of the disks on the frame. It is rather difficult to make the disks adjustable and at the same time have them secured to the frame so that they will resist the strain to which they are normally subjected. The present invention is directed to an improvement in the method of varying the width of the furrow cut by disk plows.

The general object of the invention is to provide an improved disk plow.

Another object is to provide a disk plow with improved means for adjusting the width of the furrow slice cut by the plow.

Other objects and advantages of the invention will hereinafter appear.

In the accompanying drawings:

Fig. 1 is a top plan view of a disk gang plow having my invention embodied therein, the disks being adjusted to cut wide furrow slices.

Fig. 2 is a similar view showing the disks adjusted to cut narrower slices.

Fig. 3 is a side elevation of the plow as viewed from the land side, showing the plows raised out of action.

Fig. 4 is a transverse section of the same on the line *a—a*.

Fig. 5 is a view similar to Fig. 3 with the plows lowered in action.

Fig. 6 is a view similar to Fig. 4 with certain parts in a different position, and with the relative positions of the land wheel and rear furrow wheel indicated.

Referring to the drawings:

Referring particularly to Figs. 1 and 2, my improved plow comprises as its main features a front transverse frame member in the form of a frame bar 1, supported at its furrow end by a front furrow wheel 2; a rearwardly extending diagonal plowing device carrying-beam 3 equipped with a number of plowing devices, in the present instance in the form of disks 4, pivotally connected at its forward end on a vertical axis 5 to the frame member 1; a land wheel 6 supporting the beam at its rear end on its land side; and a rear furrow wheel 7 supporting the rear end of the beam on its furrow side.

The draft is applied to the frame bar 1 on a line at right angles to said bar, in the present instance by means of a draft frame comprising two draft links 8 whose rear ends are connected by vertical pivot bolts 9 respectively to two coupling blocks 10. These blocks are in turn pivoted by means of horizontal pivot bolts 11 to lugs 12 projecting forwardly from sleeves 13 and 13$^a$ surrounding and fixed to the bar 1 at widely separated points. From their rear ends the draft links converge and have their forward ends connected together by a bolt 14. A draft plate 15 is connected with the bolt 14, and to this plate a draft bar 16 is pivoted and affords a means for the connection of the source of draft power, a tractor or draft team as the case may be. Other forms of devices for applying the draft to the frame bar 1 may be employed, that shown being merely by way of example and acting to apply the draft at right angles to the bar 1.

The plowing disks 4 are sustained by disk carrying arms 17, each comprising a forward straight portion 17$^a$ which is seated flatly against and bolted to the furrow side of the beam 3, and a rear curved portion 17$^b$ which extends outwardly from the beam in a curve struck from a center located in front of the arm, there being in the present instance three of these arms to sustain three disks. The rear end of the beam is curved in a furrowward direction similar to the curvature of the portions 17ᵇ of the arms 17, and constitutes a lateral supporting arm 3ᵃ for a fourth disk at the rear. The three forward disks are rotatably mounted on disk bearings 18 which are adjustably clamped to the curved portions 17ᵇ of the respective arm 17 by means of clamping bolts 18ᵃ which extend respectively on opposite sides of the arms through clamping plates 18ᵇ and into the disk bearings, so that the bearings may be adjusted along the arms to and from the beam. The rear disk is mounted on a disk bearing 19 which is adjustably clamped to the rear lateral end 3ᵃ of the beam by means of clamping bolts 20 which pass through the inner end of a casting or wheel supporting arm 21 applied to the rear side of the lateral end 3ᵃ, the bolts extending respectively on opposite sides of the arm and into the bearing, by which means the disk bearing and also the arm 21 may be adjusted along the lateral end 3ᵃ of the beam similar to the adjustments of the other disk bearings, the purpose of which adjustments will presently appear. The wheel supporting arm 21 extends in a furrowward direction and is provided on its outer extremity with an upright bearing 22 in which is loosely mounted an upright furrow wheel stem 23, the lower end of which is formed with an outwardly extending wheel journal 24 on which the rear furrow wheel 7 is rotatably mounted.

Also adjustably connected with the rear end 3ᵃ of the beam at its land side at a point in advance of the disk bearing 19, is an upwardly extending supporting frame 25 which is clamped to the beam by means of a clamping bolt 26 embracing the beam and the lower portion of the supporting frame so that this supporting frame may be adjusted along the curved lateral end of the beam similar to the adjustment of the disk bearing 19. The upper end of the supporting frame is provided with a horizontal transversely extending bearing 27 in which is loosely mounted the upper cranked end or journal 28 of a land wheel axle 29, whose lower end is provided with a horizontal axle arm 30 on which the land wheel 6 is rotatably mounted.

From the construction described it will be understood that the disks, the rear furrow wheel, and the land wheel, are all mounted on and carried by the single diagonal beam 3, which being pivotally connected at its forward end to the transverse frame bar 1, may be adjusted on said pivot to different angular positions relatively to the frame bar and line of draft in order to vary the transverse spacing of the disks and consequently the character of the furrow slice cut by the disks.

The beam 3 is held in its different positions of adjustment by means of a horizontal arm 31 which is fixed at its rear end to the beam and which extends forwardly therefrom alongside a lug 32 depending from the sleeve 13ᵃ, the arm being provided with a number of holes 31ᵃ through any one of which a bolt 31ᵇ may be passed and into the lug 32 to fasten the arm to the lug.

In adjusting the disks to increase the transverse space between them so as to adapt them for cutting wider furrow slices in soft ground, the beam is swung on its pivot 5 in a landward direction to cause it to assume a greater obliquity to the line of draft, and it is held in its adjusted position by the bolt 31ᵇ. This position of the parts is shown in Fig. 1 where it will be seen that the disk bearings have been set at the outer extremities of the arms 17ᵇ and the outer end of the lateral curved end 3ᵃ of the beam, in order to secure the proper angle of the disks to the line of draft. Also it will be seen that the wheel carrying arm 21 has been set at the outer extremity of the lateral portion 3ᵃ of the beam in order to preserve the proper relation of the rear furrow wheel to the furrow made by the rear disk and to the line of draft; and finally it will be seen that the frame 25 on which the land wheel is mounted has been set towards the end of the lateral portion 3ᵃ of the beam in order to maintain the parallelism of the land wheel with the line of draft. In adjusting the disks for cutting narrower furrow slices in difficult or hard land, the beam is released by the removal of the bolt 31ᵇ and is then swung on its pivot 5 in a furrowward direction to the position shown in Fig. 2 in order to bring the disks more nearly in line with each other and thereby decrease the transverse space between them, and when the proper adjustment has been attained, the arm 31 is secured by the bolt 31ᵇ in its new position. The disks are now adjusted in a landward direction on the curved supporting arms to maintain their proper angles in their new positions to the line of draft, the rear furrow wheel arm being likewise adjusted to preserve the proper relation of the rear furrow wheel to the rear disk, and finally the land wheel support is adjusted on the beam in a landward direction to maintain the parallelism of the land wheel with the line fo draft.

In these different adjustments of the beam, the front frame bar 1 is always at right angles to the line of draft, and as the front furrow wheel is sutained by this frame bar, no change is required in its relation to the draft when the beam is adjusted to vary the cut of the disks.

It will be noted from the foregoing description that the adjustments of the disks to vary the widths of the furrow slices is effected by the swinging movement of a single beam or frame member to which the disk carrying arms are permanently attached, and consequently there are no overlapping adjustable beam sections difficult to bolt together and liable to become loose, and no projection of the beam in front or in rear of the carrying wheels in the different positions of the disks. Furthermore, by reason of the fact that the rear furrow wheel support and the land wheel support are sustained by the beam itself, as distinguished from the bearing of the rear disk, this bearing is not subject to undue strains and is not required to be of undue size and out of proportion to the other disk bearings. The improved construction is therefore of unusual simplicity, is strong, solid and durable, and wholly free from detachably connected parts so difficult to maintain in firm fixed relations and so apt to become loose or displaced. At the same time the adjustability of the disks may be conveniently and quickly effected, and their angular relations with respect to the line of draft preserved in their different spaced positions. This latter feature, however, is a matter of choice rather than an essential characteristic, for if for any reason it is found advisable to change the angular relations of the disks as the change of cut is made, it would be only necessary to change the character of the curvature of the respective disk carrying arms.

In the accompanying drawings and foregoing description I have disclosed my invention in the particular detailed construction which I prefer to adopt, but it will be manifest to the skilled mechanic that the details may be variously changed and modified without departing from the limits of my invention; and it will be understood that the invention is not limited to any particular form or construction of the parts except in so far as such limitations are specified in the claims.

Having thus described my invention, what I claim is:

1. A disk plow having a forward frame adapted to receive the draft, a plow carrying beam connected thereto so as to be adjustable horizontally to different positions relative to the line of draft, a plurality of curved arms supported by said beam projecting furrow-ward, and disc plows adjustable horizontally along said curved arms to vary the angle of the plows relative to the line of draft.

2. A disk plow having a forward frame adapted to receive the draft, a plow carrying member, a plurality of disk plows carried by said member, said plow carrying member being connected to the forward frame so that it may be adjusted horizontally to different angular positions relative to the line of draft, and a land-wheel and a rear furrow-wheel carried by said member and adjustable relative to the line of draft so that the wheels may be maintained in correct position when the plow carrying member is shifted to different angular positions to vary the width of the furrow.

3. A disk plow having a forward frame adapted to receive the draft, a plow carrying member, a plurality of disk plows carried by said member, said plow carrying member being connected to the forward frame so that it may be adjusted horizontally to different angular positions relative to the line of draft without varying the distance between the disk plows, a land-wheel carried by said member and adjustable relative to the line of draft so that it may be maintained in its correct position when the plow carrying member is changed to different angular positions, and a rear furrow wheel carried by said member and adjustable relative to the line of draft.

4. A disk plow having a foward frame adapted to receive the draft, a supporting member carrying a plurality of disk plows and connected to said frame so that it may be adjusted horizontally to different angular positions relative to the line of draft, a land-wheel carried by said member and adjustable relative to the line of draft so that it may be maintained in correct position when the plow supporting member is changed to different angular positions, and a rear furrow-wheel carried by said supporting member and arranged to be adjusted automatically to maintain its parallelism to the line of draft when the plow supporting member is changed to different angular positions.

5. A disk plow having a frame member adapted to receive the draft, a plow carrying beam connected therewith and adjustable horizontally relative to the same to different angular positions with respect to the line of draft, curved plow supporting arms fixed at their inner ends to the beam and extending furrow-ward, said arms being curved from centers located in front of the same, and disk plows adjustably mounted on said arms so that they may be moved laterally along the same to vary the angle of the disks with the line of draft.

6. A plow having a forward frame adapted to receive the draft, a plow carrying member connected thereto and adjustable horizontally to different angular positions relative to the line of draft, a plurality of disk plows carried by said member, a land-wheel support mounted on said member and adjustable relative to the same to permit the land-wheel to be adjusted to maintain it parallel to the line of draft in the different adjustments of the plow carrying member, and a land-wheel mounted on said support.

7. A plow having a forward frame adapted to receive the draft, a plow carrying member connected therewith and adjustable horizontally relative thereto to different angular positions with respect to the line of draft, disk plows mounted on said carrying member, a rear furrow-wheel support mounted on the carrying member and adjustable relative to the same to preserve the proper relation of the furrow-wheel to the plows in the different adjustments of the carrying member, and a furrow wheel mounted on the furrow-wheel support.

8. A disk plow having a forward frame adapted to receive the draft, a plow carrying member connected therewith, a plurality of disk plows, a land-wheel and a furrow-wheel all carried by said member, said member being adjustable horizontally relative to the forward frame so that it may be positioned in different angular relations to the line of draft to vary the width of the furrow slice cut by the plows, and means for mounting said land-wheel and said furrow wheel respectively so that each is adjustable relative to the carrying member to permit each to be properly positioned relative to the line of draft when the carrying member is adjusted to its various positions for changing the width of the furrow slice.

9. A disk plow having a forward frame adapted to receive the draft, a plow carrying beam connected thereto and adjustable horizontally to different angular positions with respect to the line of draft, the rear end of said beam being extended laterally in a furrow-ward direction, plow supporting arms fixed to the beam, disk plows mounted on said arms and adjustable thereon to and from the beam to vary the angle of the plows relative to the line of draft, a rear disk plow mounted on the rear lateral end of the beam and adjustable thereon, a land-wheel mounted on the rear of said beam and adjustable thereon, and a rear furrow wheel support also mounted on the lateral end of the beam and adjustable thereon.

10. A disk plow having a forward frame adapted to receive the draft, a front furrow wheel mounted on said frame, a plow carrying beam pivotally connected at its front end to the frame and extending diagonally rearward therefrom and adjustable horizontally on its pivotal axis to different angular positions relative to the line of draft, a plurality of disk plows carried by said beam, a land-wheel support and a furrow wheel support mounted on the rear end of the beam and adjustable relative thereto, and land and furrow wheels mounted respectively on said supports.

11. A disk plow having a forward frame adapted to receive the draft, a plow carrying beam pivoted thereto and adjustable to different angular positions relative to the line of draft, a plurality of curved plow supporting arms attached to said beam and extending furrow-ward, disk plows mounted on said arms and adjustable horizontally to and from the beam to vary the angle of the plows relative to the line of draft, the rear end of said beam being curved, a land-wheel support adjustably mounted on the rear curved end of said beam so that it may be moved on the beam to vary the angle of the land-wheel relative to the line of draft, and a furrow wheel mounted on the curved end of said beam and adjustable relative thereto to vary its angle relative to the line of draft.

In testimony whereof, I have affixed my signature hereto.

HARRY S. DICKINSON.